US006751674B1

(12) United States Patent
Satagopan et al.

(10) Patent No.: US 6,751,674 B1
(45) Date of Patent: Jun. 15, 2004

(54) METHOD AND SYSTEM FOR REPLICATION IN A HYBRID NETWORK

(75) Inventors: Murli D. Satagopan, Bellevue, WA (US); Clifford P. Van Dyke, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/360,498

(22) Filed: Jul. 26, 1999

(51) Int. Cl.[7] .............................................. G06F 15/16
(52) U.S. Cl. ....................... 709/249; 709/236; 707/204; 707/202; 714/4
(58) Field of Search .............................. 709/249, 246, 709/248, 201, 205; 707/204

(56) References Cited

U.S. PATENT DOCUMENTS

| | | | |
|---|---|---|---|
| 5,588,147 A | | 12/1996 | Neeman et al. |
| 5,787,247 A | | 7/1998 | Norin et al. |
| 5,794,253 A | | 8/1998 | Norin et al. |
| 5,956,489 A | * | 9/1999 | San Andres et al. ........ 709/221 |
| 6,061,740 A | * | 5/2000 | Ferguson et al. ........... 709/201 |
| 6,249,883 B1 | * | 6/2001 | Cassidy et al. ............... 714/42 |
| 6,336,134 B1 | * | 1/2002 | Varma ......................... 709/105 |

OTHER PUBLICATIONS

Mindshare, Inc. *Fire Wire System Architecture: IEEE 1394a*. 2nd edition, Chapter 2, pp. 19–34. (1999).
Judd, Steve. *Consistency and the Active Directory: Dealing with Replication Latency in Your Services and Applications*. (1998).
Leach et al. *UUIDs and GUIDs*—draft. [web page] Feb. 4, 1998. http://search.ietf.org/internet-drafts/draft-leac-uuids-guids-01.txt [Accessed Jun. 9, 1999].

Microsoft Corporation, *Microsoft Windows 2000 Active Directory Technical Summary*. [web page] Aug. 1998. http://msdn.microsoft.com/library/backgrnd/html/msdn_actd-sum.htm. [Accessed Feb. 9, 2000].
Casey, Thomas, *Architectural Overview of Replication*. [web page] Sep. 1997. http://msdn.microsoft.com/library/techart/sqlrepl.htm. [Accessed Feb. 9, 2000].
Microsoft Corporation. *Microsoft SNA Server: Host Data Replication*. [web page] 1998. http://www.microsoft.com/SNA/Guide/datarep.asp. [Accessed Jun. 18, 1999].

(List continued on next page.)

*Primary Examiner*—Ayaz Sheikh
*Assistant Examiner*—Syed A. Zia
(74) *Attorney, Agent, or Firm*—Leydig, Voit & Mayer, Ltd

(57) ABSTRACT

Method and system for networking multiple-master servers, including multiple-master servers, with single-master servers are described. A checkpoint-flag is used to identify a state when the same changes are present in the change-log of a first multiple-master server, which is emulating a primary server for the single master servers in the network, and a second multiple master server in the network. This done by identifying a replication cycle in which no changes are made to either the first multiple-master server or the second multiple master serve. The change-log of the first multiple master server is adopted by the second multiple master server, thus ensuring that the multiple master server in the network have their change-logs converge to reflect the order in the change-log of the multiple master server emulating a primary server. Thus any of the multiple master servers can takeover the task of the primary server in the event such a promotion is required without inconveniencing the single master servers in the network. This strategy helps in realization of hybrid networks that retain both single master and multiple master functionality and, moreover, facilitate a smooth and economical switch to a multiple master server based network from a single master server based network.

19 Claims, 8 Drawing Sheets

OTHER PUBLICATIONS

Microsoft Corporation. *Microsoft Windows NT Server: Case Study*: www.msnbc.com. [web page] 1998. http://www.microsoft.com/NTServer/nts/exec/casestudy/casestudy/msnbc.asp. [Accessed Jun. 18, 1999].

Microsoft Corporation. *Microsoft Office Developer Web Forum: Using Database Replication*. Chapter 19 [web page] Jun. 24, 1996. http://www.microsoft.com/ACCESSDEV/Articles/BuildApp/BAPP19.HTM. [Accessed Jun. 18, 1999].

Microsoft Corporation. *Microsoft Developer's Network CD: Microsoft Windows NT Active Directory*. Jul. 1999.

Microsoft Corporation. *Microsoft Developer's Network CD: Microsoft Windows 2000 Active Directory Technical Summary*. Jul. 1999.

Microsoft Corporation. *Microsoft Developer's Network CD: Microsoft Exchange Server Directory Integration with the Microsoft Windows 2000 Active Directory*: Jul. 1999.

\* cited by examiner

METHOD AND SYSTEM FOR REPLICATION IN A HYBRID NETWORK

TECHNICAL FIELD

This invention relates generally to replication between interconnected servers and, more particularly, relates to a method to interface multiple-master domain servers with single-master servers in a hybrid network.

BACKGROUND OF THE INVENTION

Use of distributed computer networks to implement databases results in more responsive databases, including local updating and management in multiple master systems. Redundancy built into a distributed implementation results in a more resilient and reliable database. A database may be thought of as constituting two essential properties, viz., a collection of data objects and a set of procedures/tools/methods for locating a particular one of the data objects. The procedures/tools/methods for locating a particular data item are included in a directory or directory service. There may be more than one directory in a database, and possibly a directory service for assistance in locating the proper directory. The directory service is a namespace that aids in resolution of an identifier to a corresponding object, or even attribute, using appropriate mappings that include simple directory tables. Commercial databases typically include storage for the objects and implementations of directory services for navigating the directories describing the organization of the stored data in the database.

In order to minimize the risk of service disruption and facilitate faster access, commercial databases are preferably maintained on several networked computers. These computers may update each other's versions. These updating operations between computers are termed replications. If a particular computer crashes, another computer can takeover, preferably transparently. Thus, the users of the database may actually be only aware of a database-implementing network as a single entity rather than the individual components that make up the network.

A replication operation may result in the copying the entire state of a database to another database. However, this is often impractical and usually an incremental replication scheme (IRS) is implemented instead. In an IRS, changes since the last replication step, or portions thereof, are replicated to the other machine. Incremental replication often utilizes a change-log or journal to record changes as they take place. A replicating server examines the change-log of the server from which replication is being carried out to determine if all the changes since the last replication operation have been received. A convenient strategy is to use the index in the change-log to track changes to the change-log itself, and hence, to the server corresponding to the change-log.

Generally, there are two commonly used strategies for carrying out an IRS, and there are numerous variations within each strategy. The first strategy utilizes the single-master server (SMS) model in which one of the computers is designated as the primary server (PS). One or more backup servers (BS) replicate from the PS. Changes are first made to the PS and are then propagated to the backup servers via replication.

During replication between PS and BS, sometimes a lock is placed on both to ensure that the data does not change while replication is taking place. Furthermore, the replicating components are usually unavailable for the duration of the lock. The reasons for placing a lock include the desire to avoid identifying two machines as being synchronized when one or both may change during the process for synchronization itself, with the possibility of the next incremental replication operation treating non-replicated data as already having been replicated.

As a network increases in size, an increasing amount of the primary server's time is spent replicating to several BSs in the network and this becomes a serious limitation on network performance. This bottleneck is not significantly eliminated eased by using servers that partition the database and, thus, copy only a limited fraction of the data during an update from the PS because the PS receives all updates to the network and participates in all replication operations.

The second strategy for IRS is based on networking multiple-master servers (MMS). In a multiple-master system, many servers replicate from each other, and can have changes made to their databases independent of each other. This permits updates to be made locally with considerable local administration while the changes eventually are reflected in the entire network. Thus, in the MMS system there is no need for designating a particular server as the primary server. Furthermore, not everything needs to be copied to every server in the network. And, a server may even be restricted to a defined subset of the data while routing requests requiring additional data to other servers in the network.

Although this strategy makes each server available for longer periods of time, it requires sophisticated synchronization to ensure that all of the servers are being updated in an orderly fashion. Potential problems include conflict resolution if the same record is updated in an inconsistent manner in different parts of the network and the speed of replication to ensure uniform access to usable data in the entire network.

While many older networks utilize the single-master server model, the newer implementations often take the multiple-master server approach, which allows local updating and management and greater access to the servers. Not surprisingly, there is a problem in interfacing the two implementations because most users are likely to upgrade, replace or add one, or a few, of the servers in a network rather than change the entire network from a SMS to a MMS based organization. Changing the entire network is expensive and may carry the additional risk of making some old data inaccessible due to imperfect upgrades and unforeseen conflicts. Thus, users and owners of databases require an efficient replication strategy that allows coexistence of SMS and MMS in the same system.

A difficulty presented by MMS units coexisting with SMS is that changes to the database can occur, in any order, on any of the MMSs in a network while the SMS units expect to see the same order of changes on all other units. Thus, there is a need to avoid creation of duplicate, and potentially confusing and/or conflicting, entries in the database as seen by SMS compatible units.

In addition, replication strategies that take the dynamics of changes to the database into account are needed for efficient replication. One approach has been to use replication as a background activity that is rescheduled in case of a conflict with user activities.

SUMMARY OF THE INVENTION

In view of the foregoing, in accordance with this invention, a method and system are provided for effecting efficient replication between a multiple-master server (MMS), emulating a primary server (PS) in a hybrid computer network that also includes single-master servers, and another MMS so that the second MMS server may efficiently takeover from the PS if needed. For convenience, the second MMS may also be thought of as a backup server (BS). The emulation of a PS by a MMS allows the single-master servers to interact with the multiple-master servers via the PS. Other MMS servers interact with the multiple-master PS to provide and obtain updates, and, in addition, in accordance with the invention, order their change-log to reflect the same order of changes as a change-log maintained by the PS. The resultant uniformity in change-logs allows the SMS units in the network to replicate from another MMS in the network in the event the MMS is promoted to emulate a PS.

A checkpoint-flag is set to signify a successful adoption of a PS's change-log by another MMS, a BS. Subsequent updates to the BS from sources other than the PS are distinguished from the entries known to be in the same order as the entries in the change-log maintained by the PS, such as using a promotion-marker to identify changes following the setting of a checkpoint-flag. In the event the BS is promoted to emulate a role of the PS, other servers in the network can examine the promotion-marker to determine whether the corresponding entries are guaranteed to be in the order established by the previous PS. Thus, other servers in the network can replicate, from the promoted PS, the data necessary to achieve the same order as the new PS while not having to replicate data that is already ordered.

The process of setting the checkpoint-flag and replicating from a multiple-master PS can be carried out at low priority by the multiple-master backup servers in the hybrid network. Thus, replication may be performed as a background task, i.e., when the servers in the network are between user requests. A network realized according to the invention is more responsive, resistant to failure of component servers, and allows coexistence of both SMS and MMS units in the same network.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
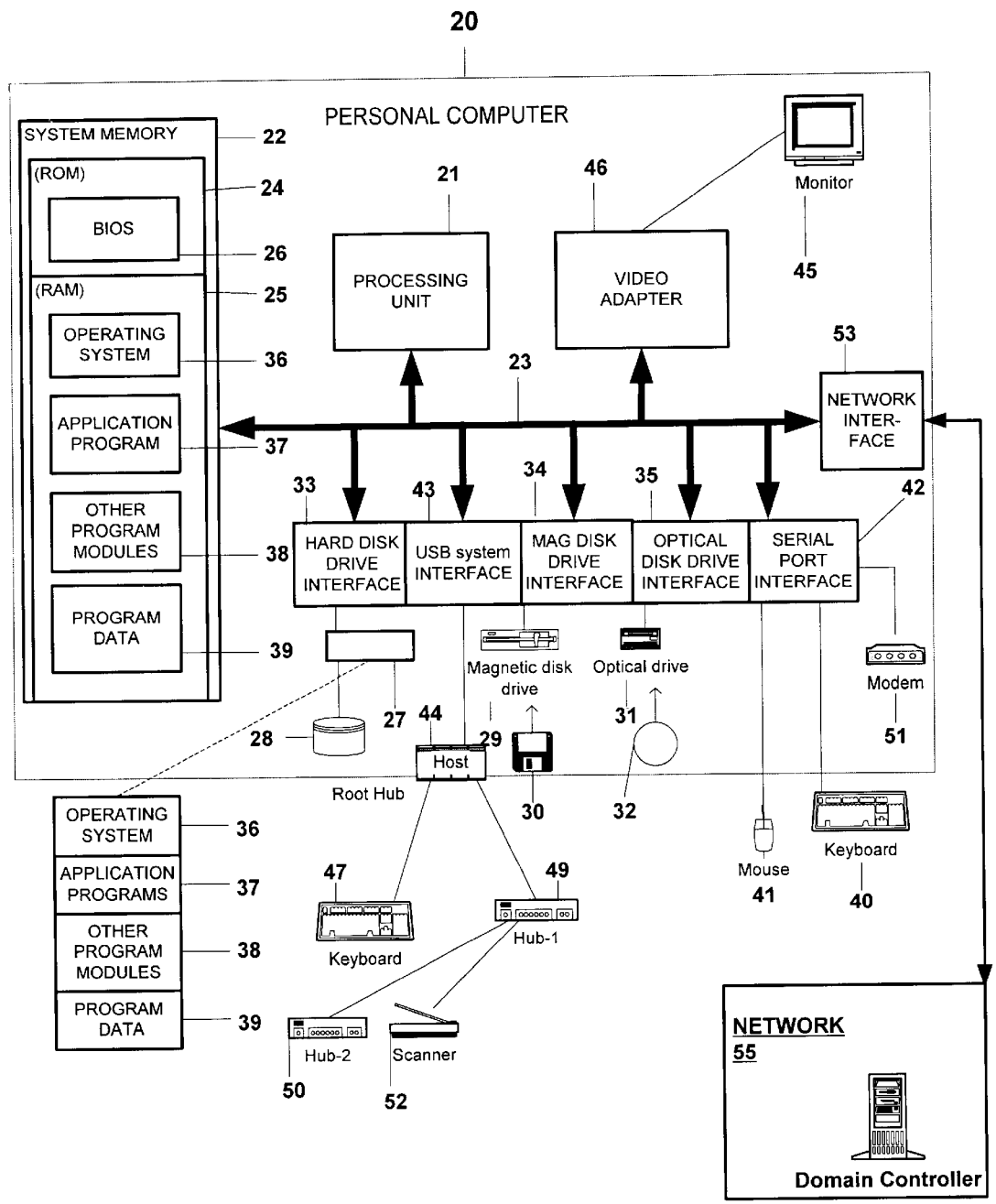
FIG. 1 is a block diagram generally illustrating an exemplary computer system on which the present invention is implemented in part.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 may further include a hard disk drive 27 for reading from and writing to a hard disk 28, a magnetic disk drive 29 for reading from or writing to a removable magnetic disk 30, and an optical disk drive 31 for reading from or writing to a removable optical disk 32 such as a CD ROM or other optical media.

The hard disk drive 27, magnetic disk drive 29, and optical disk drive 31 are connected to the system bus 23 by a hard disk drive interface 33, a magnetic disk drive interface 34, and an optical disk drive interface 35, respectively. The drives and their associated computer-readable media provide nonvolatile storage of computer readable instructions, data structures, program modules and other data for the personal computer 20. Although the exemplary environment described herein employs a hard disk 28, a removable magnetic disk 30, and a removable optical disk 32, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 28, magnetic disk 30, optical disk 32, ROM 24 or RAM 25, including an operating system 36, one or more applications programs 37, other program modules 38, and program data 39. A user may enter commands and information into the personal computer 20 through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Illustrated are keyboard 47, and a hub-1 49 connected to the root hub/Host 44. Hub-1 49 is further connected to a hub-2, 50, and scanner 51.

Other interfaces that may be used include parallel ports, game ports, and the FireWire, i.e., the IEEE 1394 specification available at http://standards.ieee.org/catalog/bus.html#1394-1995. A monitor 45 or other type of display device is also connected to the system bus 23 via an interface, such as a video adapter 46. In addition to the monitor, personal computers typically include other peripheral output devices. A network interface 53 allows the computer 20 to communicate with a network 55, which includes a plurality of domain controllers. The components within network 55 may use high bandwidth connections and switches as well as large memory storage devices to service users, such as computer 20, accessing the network 55.

The server/personal computer 20 may operate in a networked environment using logical connections to one or more remote computers/servers. The remote computer may be another personal computer, a server, a router, a network PC, a peer device or other common network node, and typically includes many or all of the elements described above relative to the personal computer 20 in FIG. 1. Such networking environments are commonplace in offices, enterprise-wide computer networks, intranets and the Internet.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Much of the following discussion will use the context of updating and maintaining databases although the described methods are also useful in distributed computing in general. Many distributed computing applications, particularly those involving data storage and access, utilize networked domain controllers (DC) implemented on servers. A DC manages a domain in a database base organized as a collection of domains. A domain may include an entire database, or may be restricted to a defined, interrelated portion of a database. Early network implementations defined one of the servers as the primary domain controller (PDC), which was, in turn, networked to one or more backup domain controllers (BDC). The BDCs replicated from the PDC in order to maintain the same order of entries as the PDC. All of these DCs were implemented as single-master servers.

Figure 2:
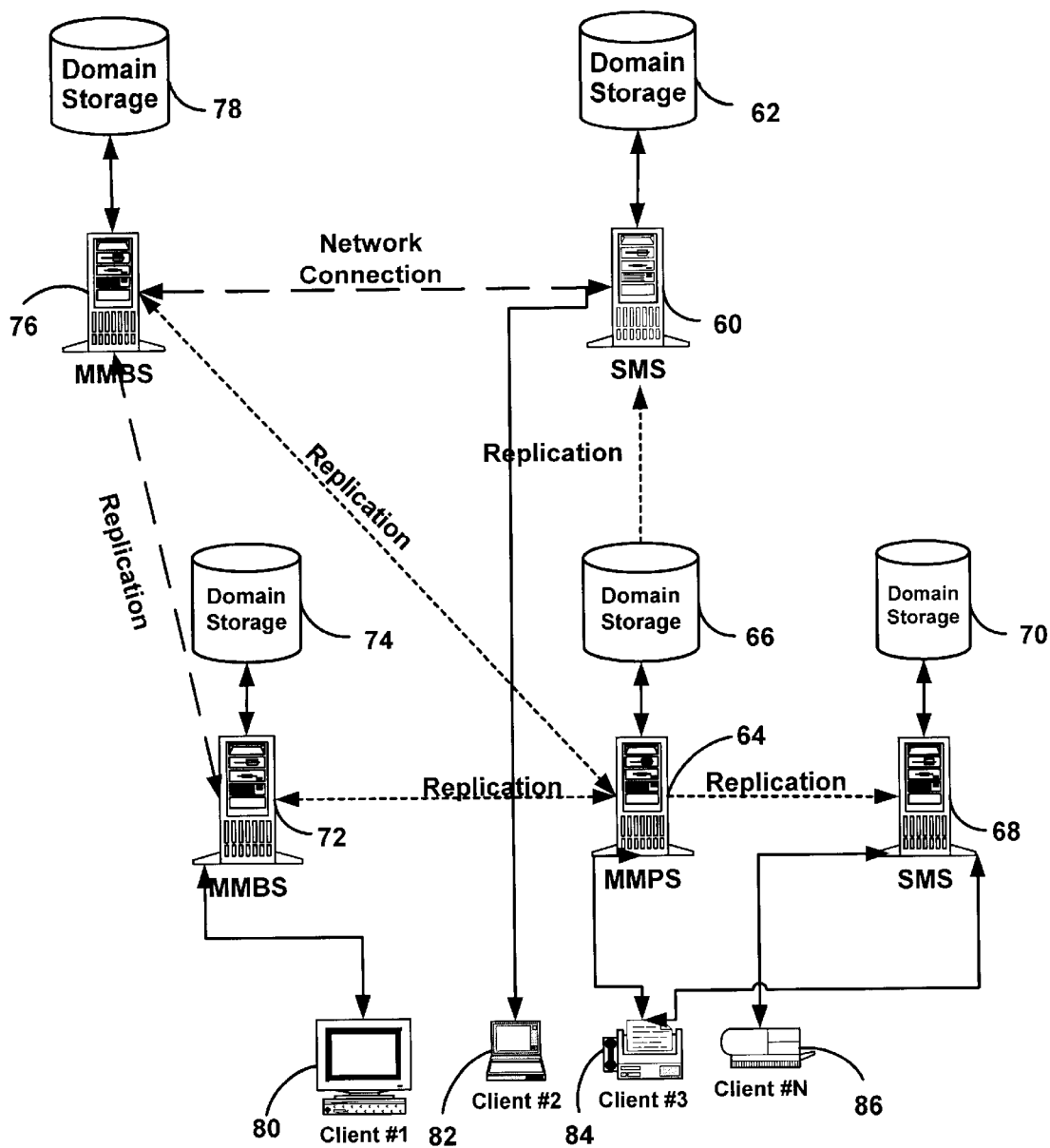
FIG. 2 is a block diagram illustrating a network of multiple-master and single-master domain controllers, including a multiple-master domain controller emulating a principal domain controller, servicing a plurality of client devices/users.

FIG. 2 illustrates an exemplary environment in which an embodiment of the invention operates. This environment includes a hybrid network with a domain storage 60 for single-master server (SMS) 62, which can communicate with a multiple-master primary server (MMPS) 64 having associated storage 66. Another SMS 68 with associated domain storage 70 is connected to the MMPS 64. MMPS 64 is also connected to multiple-master backup server (MMBS) 76 and its associated domain storage 78, and MMBS 72 and its associated storage 74. The servers in the network are shown with their associated storage to illustrate the directory service and database management services implemented by the servers. The SMSs in the network offer read-only access while the multiple-master servers (MMSs) allow read/write access. Thus, client 80 has read/write access to MMBS 72, and may modify the domain storage 74 while client 82 has read-only access to SMS 62. Similarly, client 84 has read/write access to the MMPS while client 86 has read-only access to SMS 68. Furthermore a MMBS in the network can replicate from another MMBS while the SMSs can only replicate from the PMMDC, as is illustrated by the arrows.

From the perspective of a SMS in the network, changes made to any of the MMSs in the network can make it to the SMS through the MMPS. This hybrid network is an extension of the multiple-master loose consistency with convergence model to include single master servers. Thus, all the servers, in this model, are not guaranteed to have the same changes at any given time, but over time all servers will receive all the changes, although the time frame for such convergence may vary considerably.

Figure 3:
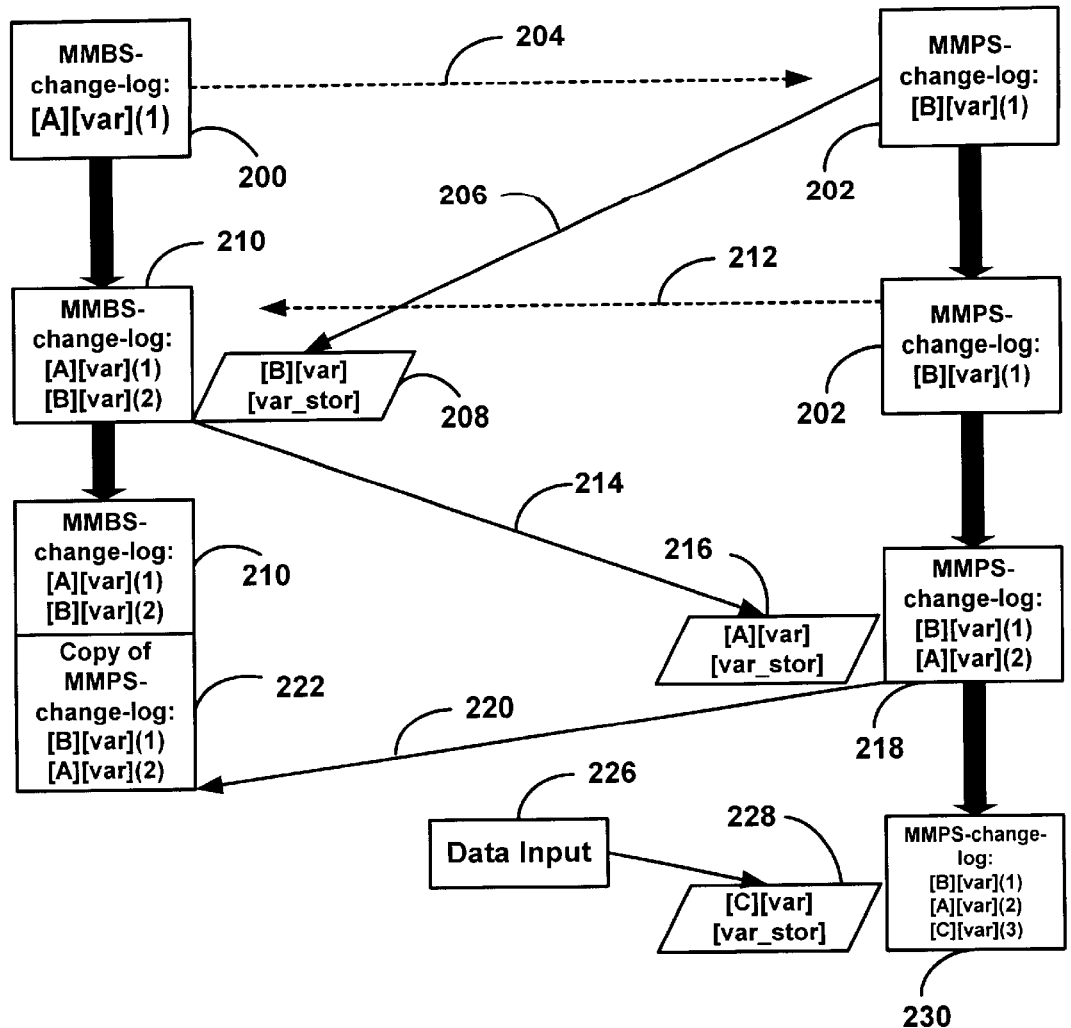
FIG. 3 is a block diagram illustrating a change-log data structure and its manipulation in course of interactions between a multiple-master primary server and a multiple-master backup server.

FIG. 3 illustrates replication between a MMBS and a MMPS. In a hybrid network comprising multiple-master and single-master servers, the multiple-master servers maintain a change-log. This is for the benefit of the single-master servers expecting to see a change-log. As shown, MMBS has a change-log 200 with a single entry comprising an identifier "A," additional data associated with "A" such as location and type of data represented by "A" stored in the field 'var,' and a change-index of '1.' The entry contains an identifier to locate the associated object. Similarly, MMPS has a change-log 202 and an entry corresponding to identifier "B." Usually, the system has object level granularity for incremental replication.

As illustrated in this embodiment, MMBS initiates replication by making a request 204 of the MMPS to identify and acquire data on MMPS that is not present on the requesting MMBS. MMPS's response 206 delivers data 208 corresponding to the identifier "B" to the MMBS, and results in modifications to the change-log 200 to generate the change-log 210 containing an entry corresponding to the identifier "B." MMPS makes a request 212 of the MMBS to acquire data not present on the MMPS.

MMBS sends a response 214 with data 216 corresponding to "A," which results in a change in the MMPS change-log 202 to generate the change-log 218. As is readily apparent from examining the change-index corresponding to identifier "A" in the change-logs 218 and 210, entries corresponding to the same data are in different orders.

An exemplary multiple-master-server system, "WINDOWS 2000," provides a method for generating a list of entries in one multiple-master-server that are not present in another multiple-master-server. Such a method may be used, e.g., in an updating operation, to discover changes in a multiple-master-backup-server that are not found in the multiple-master-primary-server entries.

MMPS sends 220 a copy of its change-log 222 to the MMBS in an embodiment in accordance with the invention. If this copy were to be adopted by MMBS, its change-log would have the same order as the change-log 218 of the MMPS. Next, a source of data 226 sends data 228 to the MMPS resulting in a new MMPS change-log 230. The MMPS change-log 230 has an additional entry corresponding to the identifier "C" and change-index '3.' The feature to note is that the change-index on the MMPS changed by being incremented in a regular fashion, i.e. a sequence of consecutive integers in this particular example.

Figure 4:
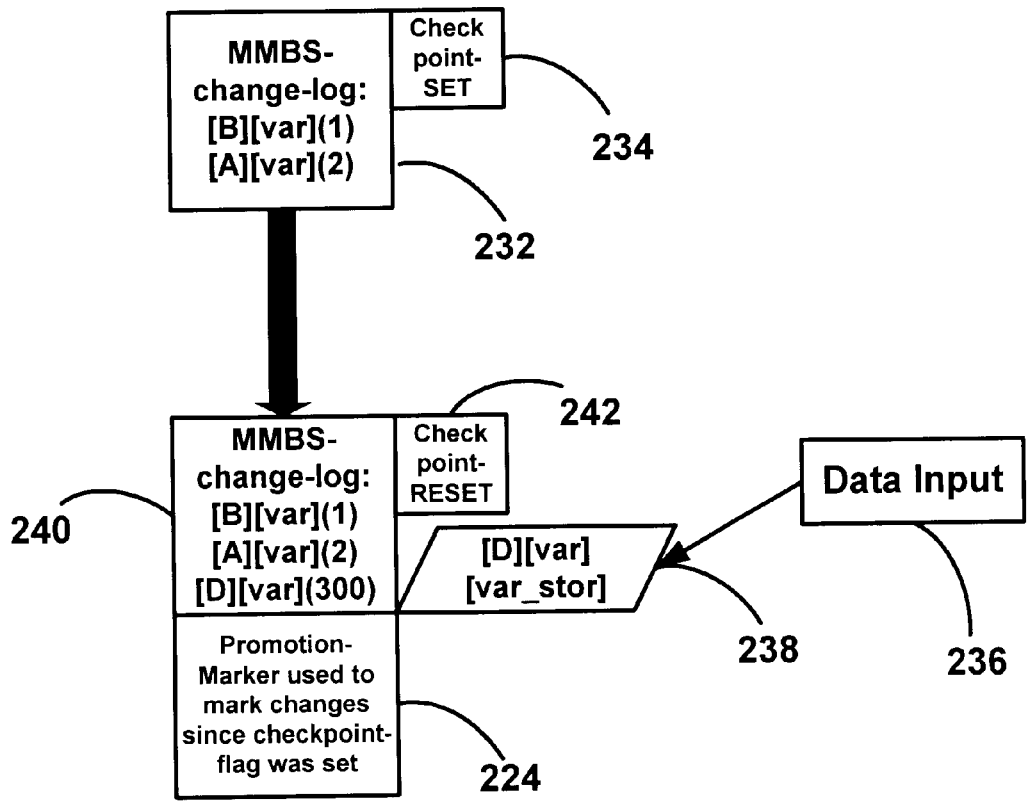
FIG. 4 is a block diagram illustrating the use of a promotion increment in entries made to a change-log on a multiple-master backup server.

Turning to FIG. 4, a block diagram similar to FIG. 3 illustrates a change-log 232 corresponding to a MMBS in an embodiment of the invention. A checkpoint-flag 234 is associated with the MMBS, although not usually a part of the change-log. The checkpoint-flag can be in at two states, and is placed in a 'SET' state when the change-log of the MMBS is sure to have the same entries as the MMPS. Else it is in a 'RESET' state.

An important function of the checkpoint-flag is to identify a replication cycle following which the MMPS and MMBS have the same entries. Since the order of the entries may be different, the MMBS simply adopts the change-log of the MMPS and discards its own change-log with the result that not only are the same entries present, but the are in the same order in the change-logs. In other words, the checkpoint-flag is placed in the SET state if 1) the change log of the MMBS has the same entries as the change log of the MMPS, although the entries may be ordered differently, and, naturally, have different change indices associated with them; 2) the MMBS contains all the changes described in the change log of the MMPS; and 3) the MMBS does not have any changes that are not reflected in the change log of the MMPS. This enables a SMS in the network to use a MMBS as the MMPS in the event the MMBS is promoted to be the MMPS.

As illustrated in FIG. 4, data input 236 adds data 238 to the MMBS resulting in the change-log 240. The checkpoint-flag's state may also be changed to 'RESET' in some embodiments to indicate changes since the last checkpoint-flag setting operation. Change-log 240 reflects the addition of data corresponding to data identifier "D" and increments the change-index from 2 to 300 to signify that data 238 may not have been added in the same order as on the MMPS in the network. This increment is termed a promotion-increment, although any manner of distinguishing such data would suffice. Usually a very large number, larger than any reasonably expected size of updates to a database, is used as a promotion increment. The presence of such a discontinuity is detected to identify entries that may not be in the same order as the entries on the MMPS. In general, a promotion-marker, not necessarily in the form of a promotion increment, can be used to determine whether the data on MMBS is in the same order as on the MMPS, as seen in the change-log.

A promotion-marker may be an increment in the change-index or a flag associated with a data entry in the change-log or a manner of storing such entries, e.g. in a separate list. The decision to use a promotion-marker may be advantageously made by examining the checkpoint-flag. Since MMSs in the network can be independently updated by clients the identical change-logs achieved following checkpoint-flag setting are likely to diverge over time. A promotion-marker is used to mark updates to a particular MMBS after setting a checkpoint-flag so that entries, that may not be in the same order as on the MMPS, are readily identified. This distinction is of significance in reconfiguring the network if the MMPS should be replaced by a MMBS due to a promotion.

If a promotion-increment has been used with an entry in the change-log then the next entry is preferably made relative to the last entry in the change-log without using another promotion increment. Thus, in the case illustrated in FIG. 4, another entry to the change-log 240 would correspond to the change-index 301 since the promotion-increment at entry corresponding to the change-index 300 already flags the subsequent entries as possibly not being in the same order as the entries on the MMPS.

An exemplary single-master server (SMS) system is provided by "MICROSOFT WINDOWS NT4.0." As previously noted, earlier generations of servers, including "MICROSOFT WINDOWS NT4.0" employed a single-master replication protocol. An embodiment of single-master replication employs a change-log to track changes in course of performing incremental replication. Whenever a change occurs an entry is written to the change-log. The entry may typically contain an index that is incremented for each entry, a reference to the location where the modified information is stored, and possibly a description of the change. In a single-master server system, including the "WINDOWS NT 4.0" implementation, changes could be made only on the PS. Windows NT 4.0 BSs also maintained a change-log consisting of the changes replicated from the PDC. The changes were replicated in the order they occurred on the PS. Therefore the change-log on the "WINDOWS NT 4.0" BSs contained changes in the same sequence as the "WINDOWS NT 4.0" PS.

If a BS were to be promoted to be the PS then the other BSs in the system could continue to replicate from this BS as the changes in the change-log retained the same order as the previous PS, although some changes may not have made it to the promoted BS. The newly promoted PS used a promotion-marker to distinguish changes received by it subsequent to being promoted to be the PS. This allowed the new PS to be pressed into service to accept changes before all of the BSs finished replicating from it. The remaining BSs in the network simply discarded entries, if any, in their change-logs corresponding to entries subsequent to the last entry on the new PS prior to being promoted, and then copied entries corresponding to changes made after the promotion on the new PS.

"WINDOWS 2000," on the other hand, provides an exemplary multiple-master server. Changes can be made on any "WINDOWS 2000" server and replicated to other "WINDOWS 2000" servers. A consequence is that different servers see changes in different orders. In accordance with the invention, in a hybrid "WINDOWS 2000", "WINDOWS NT 4.0" network, one of the "WINDOWS 2000" server acts as the principle server (PS) for the "WINDOWS NT 4.0" servers in the network. Changing the PS role from one "WINDOWS 2000" server to a second "WINDOWS 2000" server, which has replicated in accordance with an embodiment of the invention, allows for incremental replication between the new PS and "WINDOWS NT 4.0" server. This is accomplished by making changes to the second "WINDOWS 2000" server's change-log to reflect the order on the previous PS's change-log.

Hybrid networks, including computers using "WINDOWS 2000" MMS and "WINDOWS NT4.0" SMS in the network maintain the same order of changes in their change-logs. This requirement is implemented by a check-pointing scheme to ensure that changes are in the same order as on a designated primary server. Furthermore, one of the multiple-master servers in the network emulates a primary server, while each of the other MMSs may emulate a BS, i.e., a multiple-master backup sever (MMBS), in the sense that a MMBS may take over the role of emulating a PS if the need arises.

It should be noted that in some embodiments the change-log transferred from the MMPS to the MMBS in course of replication may include references to memory locations, e.g., pointers, that may not be accurate in the context of the MMBS, and, consequently, require adjustment. The transferred change-log can be adopted, following corrections by the MMBS as is known to those of ordinary skill in the art.

It is difficult to determine if any changes due to external updates also took place during replication on the PS. Such changes could be 'lost' if the PS and the replicating BS are treated as having identical change-logs. In lieu of locking the two servers for the duration of the replication operation, an embodiment, in accordance with the invention, tests to see if any changes were made to the either the PS or the BS during a replication operation. If no changes were made then it follows that the two servers have the same change-logs. In other words, a replication cycle that identifies no new changes on either server, e.g. see FIG. 6, steps 122 and 128, is used to set the checkpoint-flag, and subsequent adoption of the PS' change-log by the BS. The adoption of the transferred change-log results in the prior change-log being replaced by the transferred change-log. The adoption of the change-log may proceed as a local locked operation on the multiple-master backup server.

The consequence of locking the second server is to make the operation atomic, i.e., ensure that no changes are made to the second server when the primary server's change is being adopted as these changes can then be missed. Furthermore, the option to lock the second server for a smaller duration for performing local operations means more time is available to service users, and the routine task of replication is automatically shifted to time periods when there is less user activity.

In most instances the probability of copious changes being made to a database is small. Hence, the embodiment described above advantageously uses the dynamics of changes to a database in setting a checkpoint-flag because even if a checkpoint-flag setting operation were to fail, it is more likely to succeed upon being retried. And, allowing the synchronization procedure to be interrupted by users does not result in the repetition of every step involved in synchronizing the MMBS to the MMPS.

An embodiments, in accordance with the invention, ensures that the change-logs used by different multiple-master servers in the hybrid network maintain their entries in the same order in order to ensure that single-master servers in the network can use one of the multiple-master servers as the primary server. The multiple-master server designated to play the role of a primary server for the benefit of the single-master servers emulates a primary server although the remaining multiple-master servers in the network can continue to be updated independently of the designated primary server, unlike a true single-master server based design.

Figure 5:
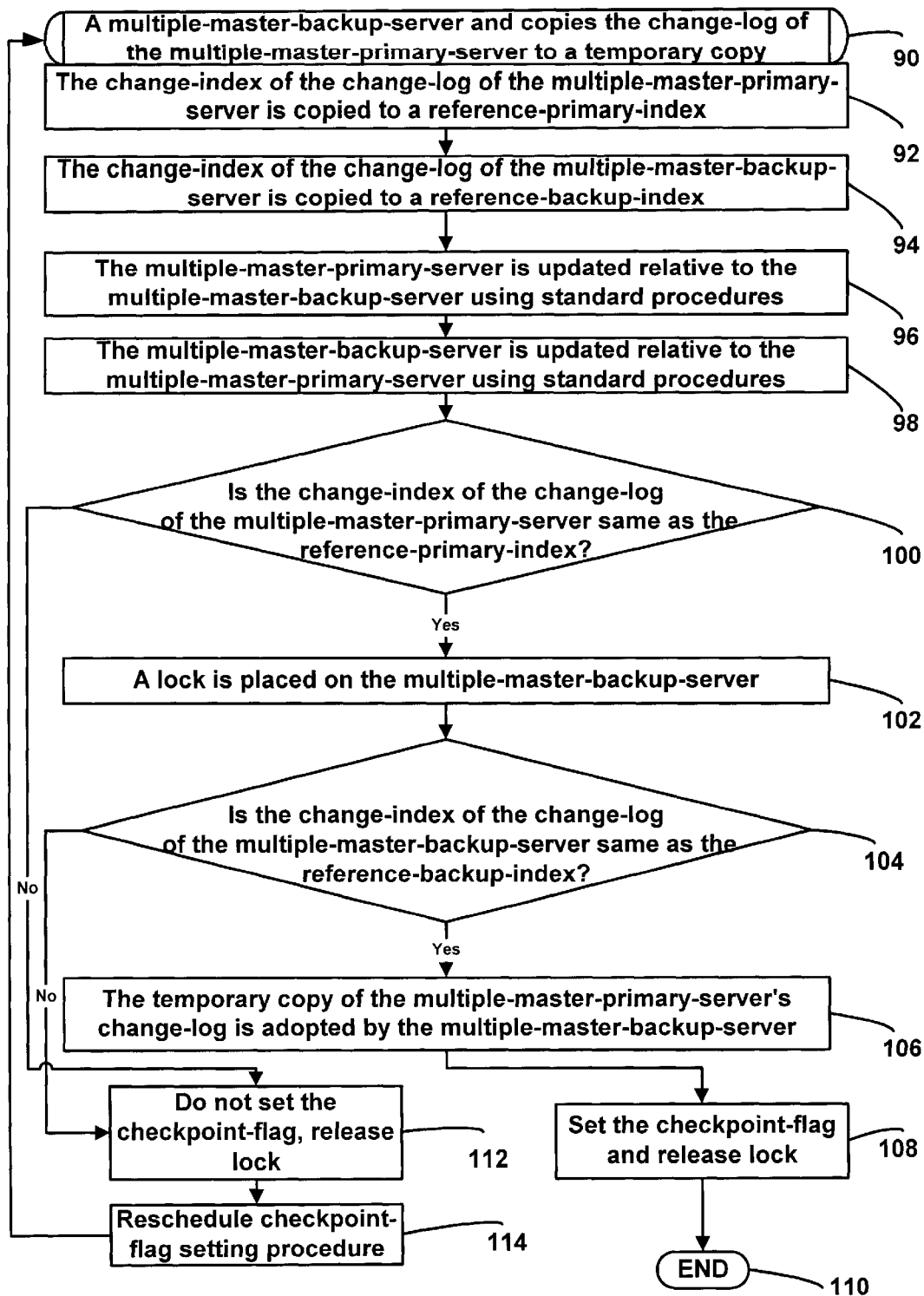
FIG. 5 is a flow diagram illustrating a checkpoint-flag setting process initiated by a backup server in course of replicating from the multiple-master primary server in a hybrid network.

FIG. 5 illustrates a flow diagram showing the sequence of events in an embodiment in accordance with the invention. At step 90 a multiple-master backup server initiates a checkpoint-flag setting procedure by copying the change-log of the multiple-master primary server to a temporary copy. The checkpoint-flag has at least two states, being set or reset. The checkpoint-flag on a MMBS is set if no changes are made during replication to the change-log of a MMPS or to the change-log of the MMBS. In other words, all entries present in the change-log of the MMPS are present in the change-log of the MMBS and vice-versa. The term "replication operation" includes updating the backup server from the primary server, and updating the primary server from the backup server, as described here. Furthermore, no third party has made any changes that may cause the change-logs to be modified during the replication operation.

In order to decide whether a checkpoint can be set, the state of the change-log corresponding to the MMPS and the change-log corresponding to the MMBS is noted by copying the change-index of the change-log of the multiple-master-primary-server to a reference-primary-index (step 92) and copying the change-index of the change-log of the multiple-master-backup-server to a reference-backup-index (step 94). A possible embodiment may place a lock on the replicating servers for the duration of the steps 90 to 92. Alternatively, the value of the change-index can be obtained from the temporary copy of change-log made at step 90 with, possibly, the multiple-master backup server placed under lock for the duration of the steps 90–94.

The process provided for replication in the multiple-master system is used to replicate from the multiple-master backup server to the multiple-master primary server (step 96). Similarly, replication is carried out from the multiple-master primary server to the multiple-master backup server (step 98). At the end of step 98 both the replicating servers have the same entries in their respective change-logs, although the order of the entries may not be the same. Since a copy of the multiple-master primary server's change-log has been made, it can be adopted by the multiple-master backup server if no changes have been made (step 106).

In a preferred embodiment, changes to the multiple-master primary server are detected as described in step 100. If no changes are detected then a lock is placed on the multiple-master backup server (step 102). The possibility of changes to the multiple-master backup server is tested next (step 104). If no changes are detected then copy of the change-log of the multiple-master primary server is adopted by the multiple-master backup server as its own change-log. Now the checkpoint-flag on the multiple-master backup server can be set (step 108) and the checkpoint-flag setting procedure exited (step 110).

The checkpoint-flag, if set, indicates that the change-log adoption was completed smoothly. If the checkpoint-flag is not set the multiple-master servers exchange data, e.g., at steps 96 and 98, but the multiple-master primary server's change-log is not adopted by the multiple-master backup server because it is known to have been changed since a copy was made. The data exchanged at steps 96 and 98 does not have to be exchanged again, making later attempts faster and more likely to succeed even if the current attempt should fail in setting the checkpoint-flag because database updates are rare events. Use of a checkpoint-flag avoids the need for extensive locking of both the servers, with resultant unavailability of resources, and instead relies on the high probability of success in a second attempt.

If the tests at step 100 or step 104 fail then the checkpoint-flag cannot be set (step 112). The checkpoint-flag setting procedure is rescheduled (step 114). It should be noted that the lock placed at step 102 leaves the principle-multiple-master-server unaffected. Furthermore, at step 106 the temporary copy of the principle-multiple-master-server-change-log may be modified, if necessary, to conform to the backup-multiple-master-server environment in course of being adopted as the multiple-master backup server change-log.

Figure 6:
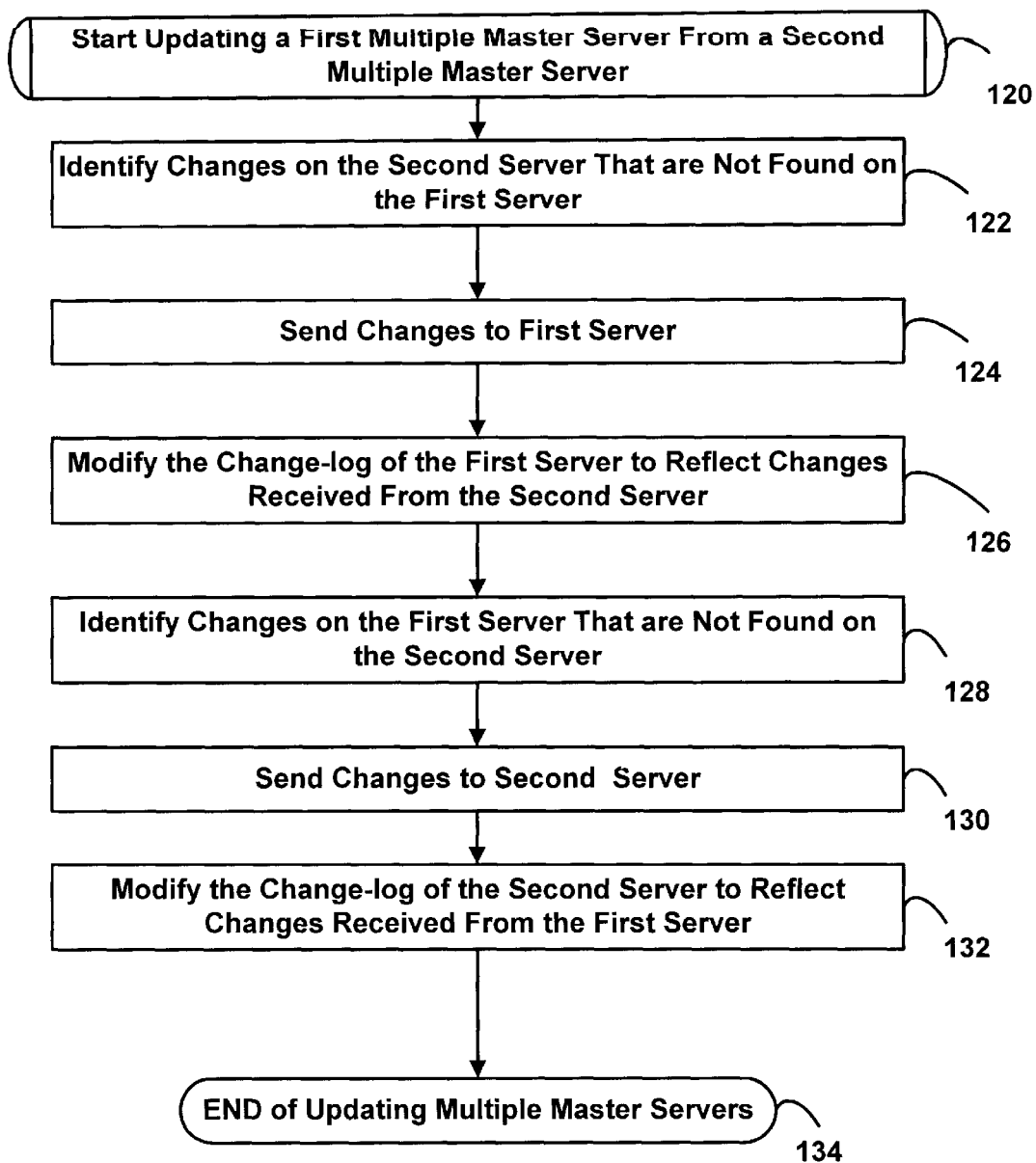
FIG. 6 is a flow diagram illustrating an exemplary replication process for interactions between two multiple-master servers in updating each other.

FIG. 6 illustrates a process for updating a first multiple-master server from a second multiple-master server. Such a procedure may be used for updating a multiple-master backup server from another multiple-master backup server. The procedure is initiated (step 120) with identification of changes on the second server that are not present on the first server, e.g., with methods provided by "WINDOWS 2000" (step 122). The identified changes are sent to the first server (step 124) followed by modifying first server's change-log, if any, (step 126). The procedure is repeated in reverse by identification of changes on the first server that are not present on the second server (step 128). ). The identified changes are sent to the second server (step 130) followed by modifying second server's change-log, if any, (step 132) followed by exiting the procedure (step 134).

Figure 7:
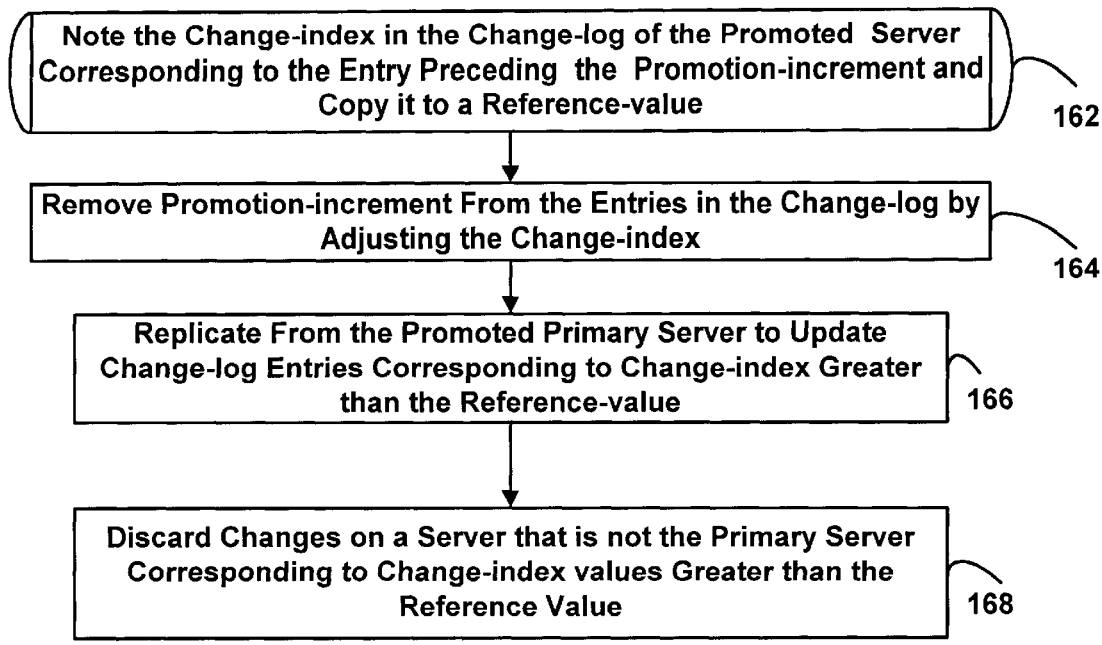
FIG. 7 is a flow diagram illustrating a process for readjusting a hybrid network in response to promotion of a multiple-master backup server to the role of a multiple-master primary server.

FIG. 7 shows a flow chart depicting the operations in an embodiment in order to update the network if a designated primary server crashes or is replaced with the promotion of a backup server. These operations allow a new primary server to flush its change-log of the promotion-increment, if any, although this is not necessary in all embodiments. The description also applies to networks having designated one of multiple-master servers to be a primary server for the single master servers. While the use of a promotion-marker has been illustrated in FIG. 4 it utility becomes clear in the context of a backup server being promoted to be the primary server. A promotion-marker, also known as a promotion-increment, marks entries in a change-log that were made after setting the last checkpoint-flag. These entries are not guaranteed to be in the same order as the entries in the change-log of the previous primary server. However, entries corresponding to a change-index of less than the first entry marked with the promotion-increment are known to be in the same order as on the prior primary server and do not need to be changed.

In FIG. 7, the promoted backup server notes the value of the change-index corresponding to the last entry known to be in the same order as the prior primary server and copy it to make it available to other servers (step 162). The new primary server may adjust its change-log by adjusting the change-index to remove the promotion-index (step 164). In other words, the jump in the change index, the promotion increment, is removed without deleting any entries from the promoted server's change-log.

Now, the remaining servers in the network replicate from the promoted server and adjust their change-logs to match with the change-log of the new primary server by replicating from the new primary server for entries corresponding to change-index values greater than the reference value noted in step 162 (step 166). Entries, corresponding to change-index values greater than the reference value, are discarded (step 168) to complete the operation.

In some embodiments, this procedure may be carried out after locking the servers. Alternatively, in other embodiments no entries are discarded when adjusting the change-logs on multiple-master servers, as is illustrated at step 168 in FIG. 7, and instead the multiple-master replication protocol illustrated in FIG. 6, is used as part of the checkpoint-flag setting algorithm illustrated in FIG. 5 following step 164.

Figure 8:
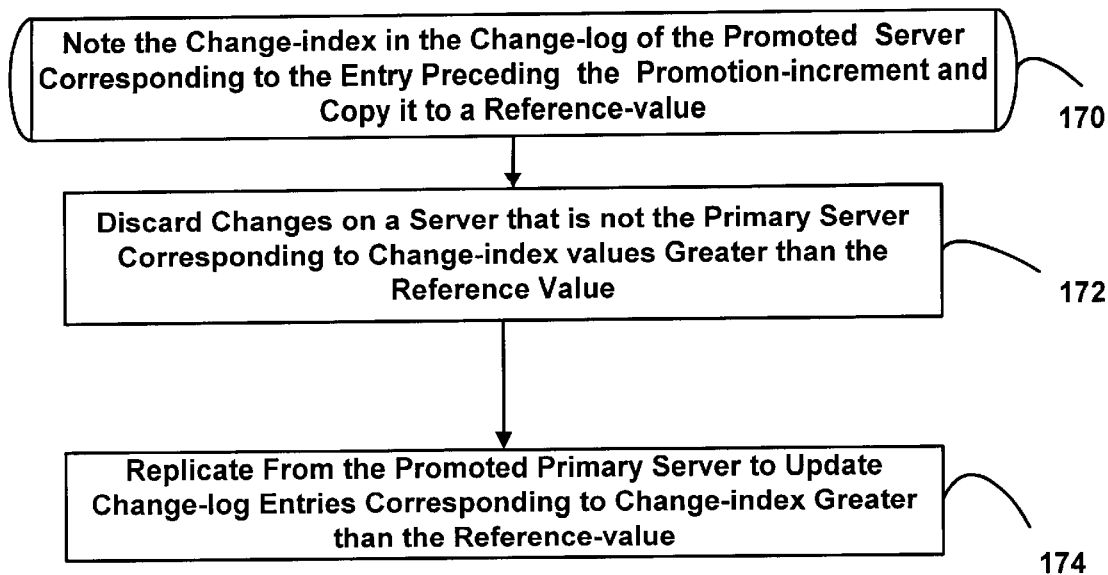
FIG. 8 is a flow diagram illustrating yet another process for readjusting a hybrid network in response to promotion of a multiple-master backup server to the role of a multiple-master primary server.

An alternative embodiment, illustrated in FIG. 8, may choose to not remove the promotion-increment. Thus, the change-index in the change-log of the promoted server corresponding to the entry preceding the promotion increment is copied to a reference-value (step 170). The changes corresponding to change-index values greater than the reference-value are discarded by other servers in the network (step 172), which, then replicate from the promoted primary server to update change log entries corresponding to change index greater than the reference value (step 174). Thus, the single master servers in the network are fooled into accepting the promotion increment as being part of the normal progression of the change-log while the multiple master servers do not actually care since they merely adopt the primary server's change-log. In preferred embodiments using such a strategy, the detection of a promotion increment on another server is carried out by examining the change-index corresponding to the latest entry then look for a discontinuity in the value until the change-index corresponding to the last replication operation is encountered. And it should be noted that this approach is possible in embodiments where the change-index is designed to handle large numbers. For instance, in an embodiment the change-index is a 64 bit integer.

It should be noted that the change-index referred to in the above description is not limited to a numerical index, although it is easy to visualize it as a numerical index. While certain changes to databases and other constructs are flagged by checkpoint-flags or promotion-markers due to their role in effecting synchronization, it is unimportant as to how the flags or the changes themselves are implemented. Thus the use of a flag instead of a promotional increment to implement a promotion-marker is within the range of obvious variations known to one of ordinary skill in the art. Similar considerations apply to the checkpoint-flag.

An embodiment, in accordance with the invention, results in a robust responsive network that replicates without denying service to users since the replication procedure can run in the background with low priority. The network is tunable because the priority of the replication procedure, the number of retries in a given interval of time and the designation of servers in the network to function as primary servers are adjustable parameters. Furthermore, the use of promotion-markers to identify changes made since replicating and check point-flag setting also provides a possible parameter for a user of the network to determine if a particular server has been substantially updated relative to the primary server or, alternatively, contains data not necessarily in synchrony with the PDC. Thus, more user friendly, efficient and effective distributed computing applications can be implemented that perform many of the background tasks during periods of low use.

The computer network using the replication procedure and checkpoint-flag setting as described above may also be viewed as a realization of a replication-capable-communication linkage suited for a hybrid computer network, the linkage comprising software and hardware modules, to connect multiple-master servers in a hybrid network containing single-master servers. Such a linkage allows updating a multiple-master server designated to be the primary server and multiple-master servers designated to be backup servers using multiple-master server replication protocols while also enabling replication of the single-master servers in the hybrid network from the designated primary server. This linkage facilitates transfer of a copy of a primary server change-log to the backup server. The copy of the primary server change-log is adopted as the backup server change-log if no changes to the primary or the backup multiple-master servers are detected during replication.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of replicating data between a first multiple master server and a second multiple master server, said first and second multiple master servers in a hybrid network having a plurality of multiple-master servers and a plurality of single-master servers, wherein furthermore, the first multiple master server is emulating a primary server for replication by the plurality of single master servers in the hybrid network, the method comprising:

updating the first multiple master server from the second multiple master server;

updating the second multiple master server from first multiple master server;

copying a change-log of the first multiple master server to a temporary copy on the second multiple master server, the change-log representing a time dependent order of the history of replication changes that have occurred on the first multiple master server and including information about replications with multiple master servers other than the second multiple master server;

setting a checkpoint-flag if no changes were made to either server during said updating steps; and adopting the temporary copy of the change-log of the first multiple master server on the second multiple master server as the change-log of the second multiple master server if the checkpoint-flag is set.

2. The method of claim 1 wherein the step of updating the first multiple master server from the second multiple master server includes the step of determining novel entries on the second multiple master server that are not present on the first multiple master server; copying said novel entries to the first multiple master server; and changing the change-log of the first multiple master server to reflect said novel entries.

3. The method of claim 1 wherein the step of updating the second multiple master server from the first multiple master server includes the step of determining novel entries on the first multiple master server that are not present on the second multiple master server; copying said novel entries to the second multiple master server; and changing the change-log of the second multiple master server to reflect said novel entries.

4. The method of claim 1 wherein the step of updating the second multiple master server from the first multiple master server includes the step of copying entries on the first multiple master server that were made since the last updating step to the second multiple master server; and changing the change-log of the second multiple master server to reflect copied entries.

5. The method of claim 1 wherein the step of updating the first multiple master server from the second multiple master server includes the step of copying entries on the second multiple master server that were made since the last updating step to the first multiple master server; and changing the change-log of the first multiple master server to reflect copied entries.

6. The method of claim 1 wherein a single master server in the hybrid network is a domain controller.

7. The method of claim 1 wherein a multiple master server in the hybrid network is a domain controller.

8. The method of claim 1 wherein the step of setting the checkpoint-flag includes comparing the change-log of the first multiple master primary server before the updating steps to the change-log of the first multiple master server after the updating steps to detect changes to the first multiple master server.

9. The method of claim 8 wherein the comparing step is performed by comparing a value of a change-index in the change-log of the first multiple master server before the updating steps to a value of the change-index in the change-log of the first multiple master server after the updating steps, where the change-index is used to index entries in the change-log of the first multiple master server.

10. The method of claim 1 wherein the step of setting the checkpoint-flag includes comparing the change-log of the second multiple master primary server before the updating steps to the change-log of the second multiple master server after the updating steps to detect changes to the second multiple master server.

11. The method of claim 10 wherein the comparing step is performed by comparing a value of a change-index in the change-log of the second multiple master server before the updating steps is compared to a value of the change-index in the change-log of the second multiple master server after the updating steps, where the change-index is used to index entries in the change-log of the second multiple master server.

12. The method of claim 1 wherein the step of adopting the temporary copy on the second multiple master server includes modifying the temporary copy for the second multiple master server.

13. The method of claim 1 including furthermore the step of using a promotion-marker to mark changes in the change-log of the second multiple master server made after the step of adopting the temporary copy on the second multiple master server as the change-log of the second multiple master server.

14. The method of claim 13 wherein the promotion-marker is a promotion-increment.

15. A computer readable medium computer-executable instructions for performing the steps for replicating data between a first multiple master server, said server emulating a primary server for the benefit of a plurality of single master servers, and a second multiple master server in a hybrid network, said hybrid network having a plurality of multiple-master servers and the plurality of single-master servers, the steps comprising:

updating the first multiple master server from the second multiple master server;

updating the second multiple master server from first multiple master server;

copying a change-log of the first multiple master server to a temporary copy on the second multiple master server, the change-log representing a time dependent order of the history of replication changes that have occurred on the first multiple master server and including information about replications with multiple master servers other than the second multiple master server;

setting a checkpoint-flag if no changes were made to either server during said updating steps; and adopting the temporary copy of the change-log of the first multiple master server on the second multiple master server as the change-log of the second multiple master server if the checkpoint-flag is set.

16. The computer readable medium of claim 15 further including computer-executable instructions for distinguishing entries made to the change-log of the second multiple master server after setting the checkpoint-flag with a promotion-marker.

17. The computer readable medium of claim 15 further including computer-executable instructions for marking entries to the change-log of the second multiple master server with a promotion-marker to indicate that promotion-marker marked entries are not from the adopted temporary copy on the second multiple master server.

18. A method of replicating data between a first multiple master server and a second multiple master server, said first and second multiple master servers in a hybrid network having a plurality of multiple-master servers and a plurality of single-master servers, wherein furthermore, the first multiple master server is emulating a primary server for replication by the plurality of single master servers in the hybrid network, the method comprising:

updating the first multiple master server from the second multiple master server;

updating the second multiple master server from first multiple master server;

determining if no changes were made to either server during said updating steps; and adopting a change log of first multiple master server as a change log of the second multiple master server if no changes were made, the change-log of the first multiple master server representing a time dependent order of the history of replication changes that have occurred on the first multiple master server and including information about replications with multiple master servers other than the second multiple master server.

19. A computer-readable medium having computer-executable instructions for performing the method recited in claim 18.

* * * * *